United States Patent Office 3,357,482
Patented Dec. 12, 1967

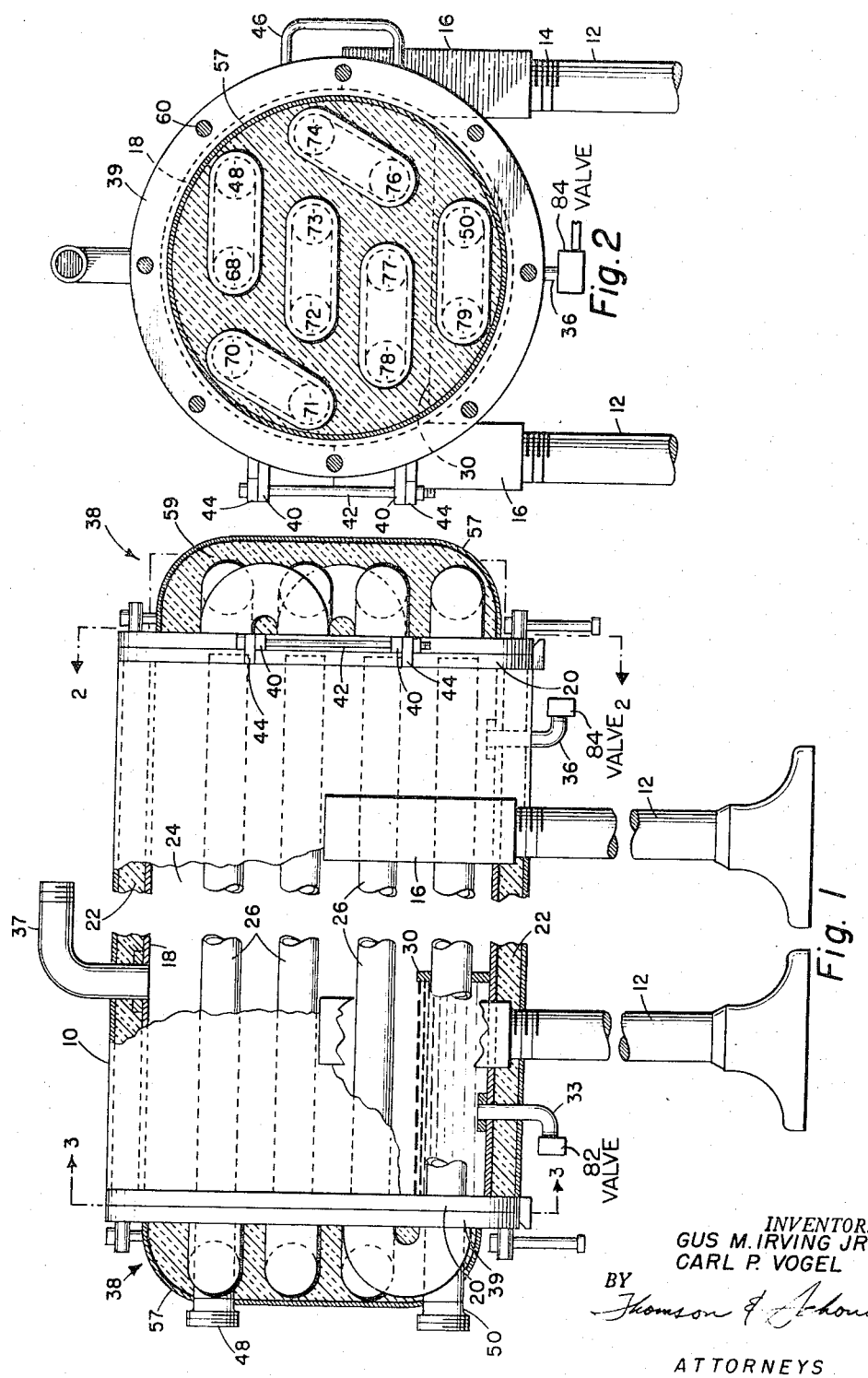

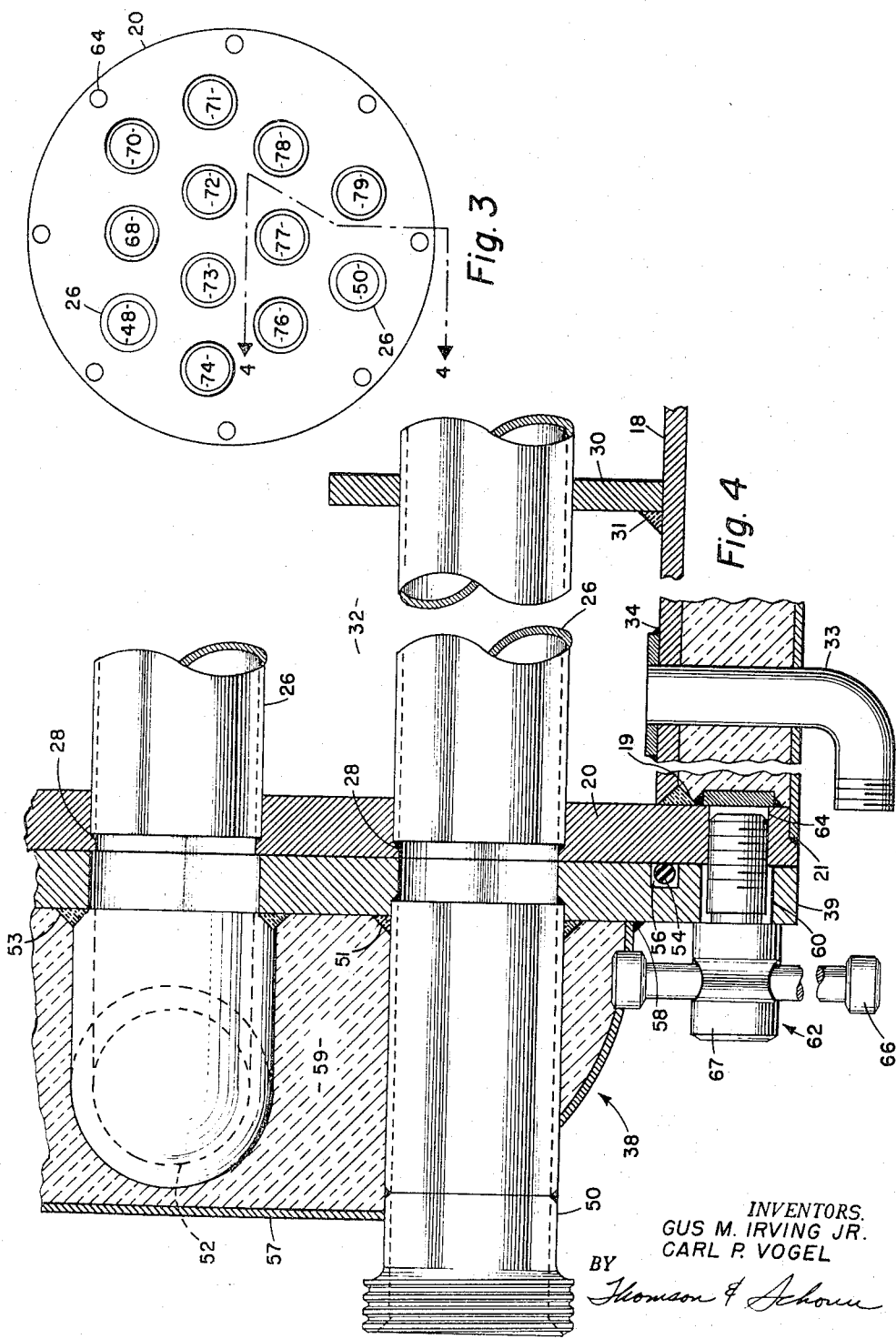

3,357,482
METHOD AND APPARATUS FOR HEAT EXCHANGING
Gus M. Irving, Jr., Lima, and Carl P. Vogel, Rochester, N.Y., assignors to Ritter Pfaudler Corporation, a corporation of New York
Continuation of application Ser. No. 81,335, Jan. 9, 1961. This application Sept. 7, 1965, Ser. No. 485,305
10 Claims. (Cl. 165—1)

This invention relates to apparatus for exchanging heat between fluids and improved methods for controlling the same, and is a continuation of our application Ser. No. 81,335 filed Jan. 9, 1961, now abandoned. One object of this invention is the provision of a more satisfactory apparatus and method for exchanging heat between fluids and improved method for controlling the same.

In the past, it has been the general practice to control the total amount of heat transferred in heat exchangers by varying the rate of flow of one or both of the fluids involved and/or the temperature of the heat transfer medium. While this practice is satisfactory for making minor variations in the total heat to be transferred, it is totally inadequate for effecting a substantial variation in total amount of heat transferred.

Our invention presents a new concept in heat exchangers based on controlling the total amount of heat transferred by varying the effective heat exchange surface area within a single exchanger longitudinally thereof. Therefore, one object of our invention is the provision of a variable capacity heat exchanger which depends upon variations in effective heat exchange surface area longitudinally of the shell end.

Although it will be understood that our invention is adaptable for diverse application, it is particularly well suited for use in the chemical industry and in the brewery industry for regulating temperature of wort during the process of brewing beer. The latter process requires widely different cooling capacities. For this reason, we have illustrated an embodiment of our invention adapted for cooling wort during fermentation and chilling the wort before tapping off.

While wort is being fermented to produce beer, it is necessary to maintain the fermenting wort at a selected temperature in order to insure the proper rate of fermentation. After the wort has been fermented to the desired stage, it must thereafter be chilled or rapidly cooled to arrest the action of the yeast in preparation for further processing. Because it requires appreciably more cooling capacity to chill the beer rapidly than is necessary to maintain temperature during fermentation, it has been necessary in the past to provide two separate cooling devices; one to maintain the fermenting wort at the proper temperature during fermentation, and the second having much larger capacity to chill or rapidly cool the beer after reaching the proper stage of fermentation. This doubling of the heat exchange equipment has required that the brewer devote an inordinate amount of floor space to this equipment to carry out the dual functions and has resulted in excessive initial apparatus, installation and maintenance costs. Therefore, it is further contemplated as an object of this invention to provide a single apparatus capable of variable heat exchanging capacity or rates thereby minimizing the user's initial investment, maintenance costs and required floor space.

A further object of our invention is to eliminate the auxiliary equipment necessary in old variable capacity heat exchangers for controlling the flow of the cooling fluids.

A disadvantage of heat exchangers utilized for controlling the temperature of food products in the fluid state being conducted through a bundle of conduits has been the difficulty in cleaning all parts of such apparatus. When it is desirable to clean the conduits through which the fermenting wort or other food in the fluid state was conducted, it has heretofore been necessary to dismantle at least a portion of the apparatus. Because our conduits are in one continuous series with a uniform cross-section throughout, our apparatus is particularly well suited for cleaning with brush balls and by the clean-in place method whereby cleaning is accomplished by the velocity of commercial cleaning solutions conducted through the conduits. Therefore, it is another object of this invention to provide apparatus minimizing the cleaning effort necessary and eliminating the necessity of dismantling any portion of the apparatus in order to accomplish thorough cleaning.

Other objects and advantages of this invention will be particularly set forth in the claims and will be apparent from the following description of this one embodiment of our invention, taken in connection with the accompanying drawings, in which:

FIG. 1 is a fragmentary side-elevational view of this embodiment of our invention partly in section with parts broken away;

FIG. 2 is an end elevational view partly in section taken on the line 2—2 of FIG. 1, looking in the direction indicated by the arrows;

FIG. 3 is an end elevational view of a perforated patterned wall 20 taken along the line 3—3 of FIG. 1, looking in the direction indicated by the arrows; and FIG. 4 is an enlarged fragmentary sectional view taken along the line 4—4 of FIG. 3 looking in the direction indicated by the arrows.

Referring to FIG. 1 of the illustrated embodiment of this invention, it preferably includes a horizontal substantially cylindrical casing supported at either end by a pair of adjustable legs 12 threaded at 14 (FIG. 2) into a pair of brackets 16 rigidly mounted at either end of the casing 10. An inner shell 18, spaced from and extending concentrically through casing 10, is rigidly mounted at either end to a tube sheet 20 such as by a weld 19 (FIG. 4). The tube sheet 20 is rigidly mounted on the casing 10 such as by the illustrated weld 21 (FIG. 4). The annular space 22, created between the casing 10 and the inner shell 18, is preferably filled with insulation to minimize heat transfer from a chamber 24 provided by the shell 18 through the casing 10.

A plurality of cooling tubes 26 are mounted in tube sheets 20. These tubes extend the full length of the chamber 24 in parallel relationship to each other and are substantially equi-distantly spaced to provide equal heat transfer. Tube sheets 20 are patterned with equi-distantly. spaced circular perforations complementing the outside diameter of the tubes 26 for receiving these tubes rigidly mounted therein as, for example, by welding, like illustrated at 28 (FIG. 4).

This arrangement of a hollow chamber 24 closed at both ends by the tube sheets 20, having tubes 26 rigidly mounted in the perforations, provides a convenient arrangement for cleaning of the tubes whereby a brush ball or other cleaning apparatus may be thrust through the entire length of each tube 26 for cleaning thereof.

The chamber 24 is provided with a partition 30 preferably dividing only the lower portion of the chamber as illustrated in section in FIG. 1 and in broken lines in FIG. 2. Preferably, the two lowermost tubes 26 extend through the partition 30 as illustrated in FIGS. 1 and 4 and are rigidly mounted thereto in a fluid tight manner. The partition 30 is rigidly mounted to the shell 18, as for example, by the weld 31 shown in FIG. 4. Partition 30 provides a fermenting-cooling or heat transfer compartment 32 (FIG. 4) comprising that cubical area defined by the shell 10, partition 30 and the left-hand wall 20 as viewed in FIGS. 1 and 4, the purpose of which will hereinafter be described. A heat transfer inlet pipe or conduit 33 extending from outside casing 10 to the interior surface of the shell 18 where it is rigidly mounted as, for example, by a weld 34 (FIG. 4) provides access to the compartment 32. A second heat transfer inlet pipe or conduit 36 (FIG. 1), mounted in the same manner as inlet pipe 33, provides access to the chamber 24 on the opposite side of the partition 30 from the pipe 33. A discharge outlet 37 provides access to the top of the chamber 24 through which dissipated refrigerant is discharged.

A door generally indicated by the numeral 38 is provided at either end of the chamber 24 for closure of the conduits 26. Each door 38 is provided with a perforated wall 39 identical to tube sheet 20 in shape, size and perforation pattern. The walls 39 are each provided with a hinge comprising two laterally extending members 40 (FIG. 2) rotatably mounted on a shaft 42 mounted to two laterally extending members 44 of tube sheet 20. These hinges permit an operator to manually grasp a handle 46 and rotate the doors 38 axially of shaft 42 away from the casing 10.

The left-hand door, as viewed in FIG. 1, is provided with an inlet 48 and an outlet 50, both of which are connected at the left as viewed in FIG. 2 through conduits (not shown) to a wort fermenting tank (not shown) and are rigidly mounted at the right to the wall 39 as, for example, by a weld 51, as illustrated in FIG. 4.

Interconnecting conduits or return bends 52 having a short radius are rigidly mounted to walls 39 as, for example, by a weld 53 shown in FIG. 4, to interconnect the entire bundle of tubes 26 when doors 38 are closed, thereby to define one continuous passage extending from inlet 48 through tubes 26 and interconnecting conduits 52 and terminating at outlet 50.

It will be understood that the interconnecting conduits or return bends 52 are of the same diameter as tubes 26 in order to maintain the same velocity of the wort or beer flowing through the conduits 26 as the liquid passes through these interconnecting conduits 52; thus, an unobstructed, continuous flow of the wort or beer is provided by the interconnecting conduits 52. As mentioned before, this provides very satisfactory equipment for utilizing the clean-in place method of cleansing.

With reference to FIG. 4, the perforations provided in walls 20 and 39 and the abutting ends of tubes 26, inlet 48, outlet 50 and the interconnecting conduits 52 are machined to provide an accurate abutting fit of these parts. Due to this accurate machining of parts, only a single seal 54 seated in a groove 56 circumferentially encompassing all of the perforations provided in door 39 is necessary to properly seal the walls 20 and 39 together and provide a fluid leak-proof continuous passage commencing with inlet 48 and ending with outlet 50.

Each door 38 is provided with an insulation pan 57 rigidly mounted to the wall 39, as for example, by a weld 58, to cover all interconnecting conduits 52, and the left door 38, as viewed in FIG. 1, is provided with two holes through which inlet 48 and outlet 50 extend. That portion of the interior volume 59 of pan 57, not occupied by the inlet 48, outlet 50, or interconnecting members 52, is filled with insulation to prevent exchange of heat.

The walls 39 are provided with a plurality of bores 60 (FIGS. 2 and 4) adapted for receiving a threaded locking device 62 (FIG. 4) when threaded into bores 64 provided through tube sheet 20 in a pattern shown in FIG. 3. When pressure is applied to a lever 66 of locking device 62, an enlarged tubular portion 67 frictionally engages wall 39, forcing the tube sheets 20 and 39 to seal. It will be understood that any of a multitude of commonly known door-locking devices could be implemented with complete satisfaction.

During the beer brewing process, it is necessary to provide wort-cooling facilities in order to maintain the wort as the proper temperature during fermentation. When the wort has sufficiently fermented to be tapped off as beer, it is necessary to chill or cool down the beer as the final step, thereby to stop any further fermentation.

Heretofore, it has been necessary to provide separate facilities for maintaining the wort at proper temperature and for chilling the beer. In the past, wort cooling equipment has consisted of either closed cooling units or open type coolers provided with air-conditioning equipment for cooling the exposed wort and it was necessary to provide separate refrigerating equipment to chill the beer. As stated above, one of the objects of this invention is to eliminate any necessity of this auxiliary wort-cooling equipment whether of the nature of closed refrigeration units or open room air-conditioning equipment. This is accomplished by the provision of the partition 30 to thereby separate a length of part of the tubes 26 longitudinally of the shell from the entire bundle of tubes 26. Thus, two refrigerating or heat-transfer units are build into a single shell and the cooling capacity may vary greatly depending upon the brewer's needs, as, for example, from two tons of refrigeration to one hundred tons or more.

Heat exchange fluid such as liquid ammonia or other selected volatile refrigerant is introduced through the refrigeration inlet pipe or conduit 33 into the fermenting cooling compartment 32 created by the partition 30 until filled to the selected level covering a portion of the two tubes 26, at which level it is maintained during the wort fermenting process. Level control apparatus, for example, an automatically controlled valve 82 (FIG. 1) responsive to the level of the refrigerant is provided to maintain the level of the refrigerant at the selected level throughout the fermentation process. Wort is then continuously circulated from the fermenting tank (not shown) through the inlet 48, tubes 26 to the outlet 50 and back to the fermenting tank in order to maintain the wort at a selected fermenting temperature. During fermentation, the refrigerant is evaporated and discharged out of the outlet 37 at the top of the chamber 24

It will be understood that evaporation or boiling of the liquid ammonia on the surface area of those portions of the tubes 26 which are covered by the ammonia absorbs heat very rapidly from the fermenting wort. Although there is some heat transfer taking place on the surface area of the tubes 26 over which the vaporized ammonia passes before being discharged from the chamber through outlet 37, most of the heat transfer takes place on the surface of the tubes 26 immersed by the liquid ammonia, because the latent heat of vaporization of liquid ammonia or other liquid refrigerant is many times greater than the capacity of the gaseous refrigerant to absorb heat after vaporization of the liquid.

It will be further understood that the positioning and the height of the partition 30 will depend upon the required cooling capacity during cooling of the fermenting beer.

At the proper time for chilling the wort to stop further fermenting thereof, more liquid ammonia of refrigerant is introduced into the chamber 24 on the other side of the partition 30 through inlet 36 until the entire bundle of tubes 26 is submerged. Level control apparatus, for example, an automatically controlled valve 84 (FIG. 1) responsive to the level of the refrigerant is provided to maintain the level of the refrigerant at the selected level about the tubes 26 so that the vaporized ammonia may escape through outlet 37 without any of the liquid ammonia being discharged through the outlet 37 by the vigorous boiling thereof. Thus, the entire lengths of all tubes 26 are cooled. This greatly increases the heat exchange surface area within the chamber and enables the wort to be rapidly chilled before tapping off and conducting of it to storage or bottling facilities.

The surface area of tubes 26 submerged during cooling of the fermenting beer and during chilling is carefully determined to provide exactly the desired amount of cooling capacity required for those two respective stages of cooling wort while brewing beer.

Thus, we have provided a combination of two or more heat exchangers within the confines of one shell by varying the area where substantially all of the heat exchange takes place.

Referring to FIG. 3, the wort or beer being circulated through the bundle of conduits 26 passes in the following consecutive order therethrough, commencing with the inlet 48 through 68, 70, 71, 72, 73, 74, 76, 77, 78, 79 and is discharged from the outlet 50. These same numerals are used to designate the other end of those tubes respectively shown in broken lines in FIG. 2.

At any time that it is necessary to clean this combination cooler, the locking devices 62 may be unlocked and the doors 38 are rotated out of the way, and a brush or other cleaning device is inserted through the entire length of each conduit 26 just as the barrel of a gun might be mechanically cleaned. The interconnecting conduits 52 are constructed of sufficiently short radius to be readily accessible for mechanically cleaning with a minimum expenditure of time and money.

It will be understood that when cleaning is necessary the doors 38 may remain closed and either the brush ball or clean-in place method may be utilized to effect thorough cleaning by introduction of the brush ball or cleaning solution through inlet 48 or outlet 50.

While we have shown and described the preferred form of mechanism of our invention it will be apparent that various modifications and changes may be made therein, particularly in the form, number and relation of parts such as the partition 30, without departing from the spirit of our invention as set forth in the appended claims.

We claim:

1. Variable capacity heat exchange apparatus for transferring heat from a fluid passing through conduits to a liquid in a surrounding shell comprising in combination: a sealed shell, at least one tube extending through said shell for conducting said fluids; partition means dividing said shell into at least two volumetric liquid receiving heat transfer compartments in said shell surrounding only a portion of said tube; and means conducting said liquid from a source of supply in and out of each of said compartments and separately into at least one of said compartments for filling each of said compartments.

2. Variable capacity heat exchange apparatus for transferring heat from a fluid passing through conduits to a liquid in a surrounding shell, comprising in combination: a sealed shell, at least one tube extending through said shell for conducting said fluid, partition means secured to the bottom of said shell providing at least two liquid receiving heat transfer compartments in said shell surrounding only a longitudinal portion of said tube; and means coactive with said partition means for selectively filling and confining said liquid to each one of said compartments defined by said partition means.

3. Variable capacity heat exchange apparatus for transferring heat from a fluid passing through conduits to a liquid in a surrounding shell comprising in combination: a sealed shell, a plurality of tubes extending through said shell for conducting said fluid, partition means secured to the bottom of said shell providing at least two liquid receiving heat transfer compartments in said shell surrounding only a longitudinal portion of less than all of said tubes; and means coactive with said partition means for selectively filling and confining said liquid to each one of said compartments defined by said partition means.

4. Variable capacity heat exchange apparatus for transferring heat from a fluid passing through conduits to a liquid in a surrounding shell, comprising in combination: a sealed shell, at least one tube extending through said shell for conducting said fluid, partition means secured to the bottom of said shell providing at least two liquid receiving heat transfer compartments in said shell surrounding only a longitudinal portion of said tube; and means selectively conducting said liquid from a source of supply in and out of each of said compartments for filling each of said compartments selectively.

5. Variable capacity heat exchange apparatus for transferring heat from a fluid passing through conduits to a liquid in a surrounding shell comprising in combination: a sealed shell, at least one tube extending through said shell for conducting said fluid, partition means secured to the bottom of said shell providing at least two liquid receiving heat transfer compartments in said shell surrounding only a longitudinal portion of said tube; and means conducting said liquid from a source of supply separately into each of said compartments for filling each of said compartments separately.

6. Variable capacity heat exchange apparatus for transferring heat from a fluid passing through conduits to a liquid in a surrounding shell comprising in combination: a sealed shell, at least one tube extending through said shell for conducting said fluid, partition means secured to the bottom of said shell providing at least two liquid receiving heat transfer compartments in said shell surrounding only a longitudinal portion of said tube, and means coactive with said partition means for confining said liquid to one of said compartments defined by said partition means, including means separately supplying said liquid from a source of supply to each of said compartments.

7. Variable capacity heat exchange apparatus for transferring heat from a fluid passing through conduits to a liquid in a surrounding shell comprising in combination: a sealed shell, at least one tube extending through said shell for conducting said fluid, partition means secured to the bottom of said shell providing a separate heat transfer compartment extending only a longitudinal portion of the length of said shell and surrounding only a longitudinal portion of said tube, and means for separately conducting said liquid from a source of supply to said compartment and to said shell and discharging dissipated liquid.

8. Variable capacity heat exchange apparatus for transferring heat from a fluid passing through conduits to a liquid in a surrounding shell comprising in combination: a sealed shell, at least one tube extending through said shell for conducting said fluid, partition means secured to the bottom of said shell providing a separate heat transfer compartment extending only a longitudinal portion of the length of said shell accessible only at substantially its top to the remainder of said shell and surrounding only a longitudinal portion of said tube, and means for separately conducting said liquid from a source of supply to said compartment and to said shell and discharging dissipated liquid.

9. A method for transferring heat between a heat transfer liquid in a single shell and a fluid being conducted through at least one tube extending through two or more separated volumetric heat transfer areas within the single shell chamber comprising the following steps: introducing a selected quantity of said liquid into only one of said volumetric areas and confining said liquid to said one compartment, conducting said fluid through said conduit, adding said liquid to the other of said volumetric areas to vary the heat transfer capacity of said shell chamber.

10. A method for transferring heat between a heat transfer liquid in a single shell and a fluid being conducted through at least one tube extending through two or more separated volumetric heat transfer areas within the single shell chamber comprising the following steps: introducing a selected quantity of said liquid into only one of said volumetric areas and confining said liquid to said one compartment, conducting said fluid through said conduit, adding said liquid to the other of said volumetric areas to vary the heat transfer capacity of said shell chamber and thereafter recirculating said same fluid through said conduit for increased heat transfer of said fluid.

References Cited

UNITED STATES PATENTS

| | | | |
|---|---|---|---|
| 447,396 | 3/1891 | Worthington | 165—101 |
| 1,937,809 | 12/1933 | Buehler | 62—219 |
| 2,964,926 | 12/1960 | Ware | 62—396 X |

ROBERT A. O'LEARY, *Primary Examiner.*

C. SUKALO, *Assistant Examiner.*